Patented Apr. 9, 1929.

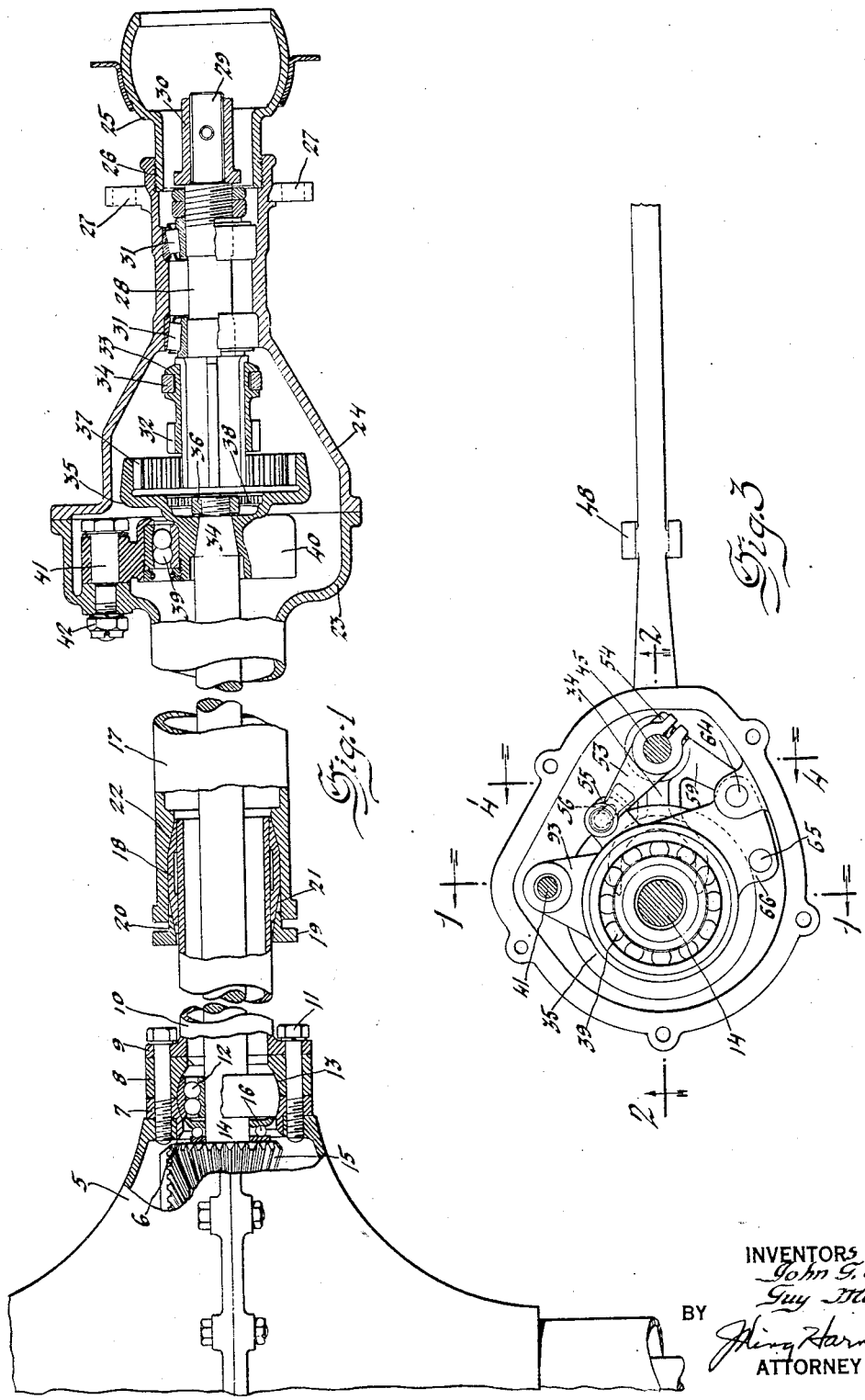

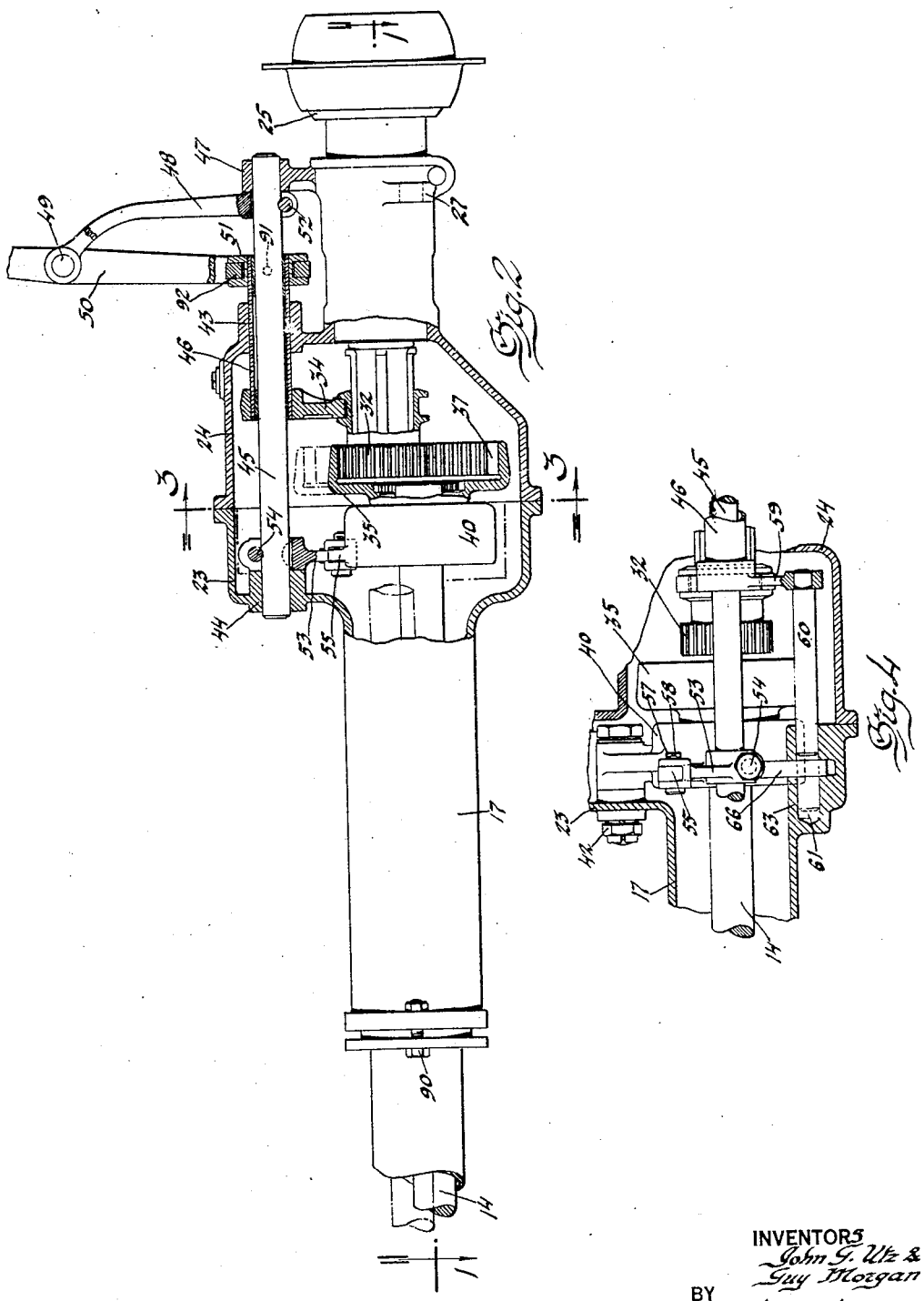

1,708,457

UNITED STATES PATENT OFFICE.

JOHN G. UTZ, OF DETROIT, MICHIGAN, AND GUY MORGAN, OF NEW YORK, N. Y., ASSIGNORS, BY DIRECT AND MESNE ASSIGNMENTS, TO THE WARFORD CORPORATION, OF NEW YORK, N. Y., A CORPORATION OF NEW YORK.

DRIVING MECHANISM FOR AUTOMOBILES.

Application filed January 12, 1925. Serial No. 1,897.

It is the primary object of our invention to provide a compact, easily assembled and quietly operated auxiliary transmission for automobiles.

With the above, and other objects in view, our invention consists in the arrangement, combination and construction of the various parts of our improved device as described in the specification, claimed in our claims and shown in the accompanying drawings, in which:

Fig. 1 is a longitudinal sectional view of our improved device looking downwardly on line 1—1 of Fig. 3 and on the line 1—1 of Fig. 2.

Fig. 2 is a longitudinal sectional view of our improved device looking upwardly on line 2—2 of Fig. 3.

Fig. 3 is a transverse sectional view taken on line 3—3 of Fig. 2.

Fig. 4 is a detail sectional view taken on line 4—4 of Fig. 3.

While our improved transmission is applicable to all makes of automobiles, it has been particularly designed for use on Ford automobiles and many of the parts have been arranged to fit the present structure of the Ford automobile.

We have shown diagrammatically, and partly broken away, a rear axle housing 5, which may be of the conventional type, having the conventional differential gearing therein. Centered in the forward central opening in the housing 5, as at 6, is an annular member 7 adjoining which is an annular member 8 against which the flange 9 of a torque tube 10 abuts, the entire assembly being secured to the rear axle housing by means of studs 11.

Mounted in the housing thus effected is a ball bearing 12 having the outer periphery of the outer race-spherical and seating in the radius provided on the inner periphery of the combined members 7 and 8, as at 13. Mounted in the bearing 13 is a drive shaft 14 having a pinion 15 on the end thereof and having a thrust bearing 16 provided thereon between the bearing 12 and the pinion 15. The pinion 15 meshes with the drive gear of the rear axle gearing.

The torque tube 10 is joined to a second torque tube 17, of larger diameter than the tube 10, by means of a member 18 inserted between the two tubes adjacent their ends and an annular wedge 19 having a tapered flange 20 thereon, adapted to cooperate with the taper 21, provided on the one end of the member 18. The opposite end of the member 18 is likewise tapered to conform with the taper on the inner periphery of the tube 17 so as to effect a snug joint as at 22. The member 18 should preferably be split to permit a squeezing together of its edges when clamped in position. After thus being clamped together the flanges of the ring 19 and the end of the torque tube 17 are bolted together by the bolts 90.

Provided in the forward end of the housing 24 is a drive shaft 28 to the squared end 29 of which a connection 30 for the conventional universal joint leading from the standard transmission of an automobile, may be made. Also positioned in the forward end of the housing 24 are roller bearings 31, in which the drive shaft 28 is adapted to rotate. The rearward end of the drive shaft 28 is splined to accommodate a pinion 32 having a forwardly extending portion provided with a groove 33 for the accommodation of a shifting fork 34.

The forward end of the propeller shaft 14 is tapered as at 34, to accommodate the tapered hole in the double gear member 35, the two being secured together by a conventional key arrangement and by a nut 36 on the end of the propeller shaft. The double gear member 35 is provided with a large internal gear 37 and a small internal gear 38, with which the pinion 32 is adapted to alternately mesh.

Around the hub portion of the double gear member 35 is a self-aligning ball bearing 39 carrying a casing 40.

The casing 40 is pivotally secured, through the ear 93 thereon, to a pivot bolt 41 extending through the housing 23 and held in place by the nut 42.

Extending through the housing 24 as at 43, and through the housing 23 as at 44, is a shaft 45. Slidably mounted on the shaft 45 is a sleeve 46, on which is positioned the shifter fork 34. The forward end of the shaft 45 is supported in a lug 47 against which lug the lower portion of the forked arm 48 which encircles the shaft 45 is adapted to bear. The arm 48 is forked and pivotally connected as at 49 to a gear shifting lever 50, the lower end of which is forked to engage a pin 91 provided in the collar 92 in the grooved member 51 on the outer end of the sleeve 46.

The lower end of the arm 48 which encircles the shaft 45 is preferably split so as to permit clamping of the same around the shaft 45 by means of a bolt 52. It will be noted that the bolt 52 extends through a groove in the shaft 45, to further assist in holding the connection of the arm and shaft against longitudinal movement.

Keyed on the rearward end of the shaft 45 and also clamped by means of the bolt 54 is a lever 53, the opposite end of which is forked to accommodate the ear 55 on the side of the casing 40. An elongated aperture 56 is provided in the ear 55 and a pin 57 is disposed through the aperture and through suitable aligned openings in the forked portion of the lever 53 and secured in place by a cotter pin 58. Thus when the shaft 45 is rotated, the casing 40 will be raised upwardly or downwardly in accordance with the rotation of the shaft.

In order to lock the mechanism with the propeller shaft 14 in its raised or lowered position, we have provided an arm 59 integral with the shifter fork 34, the outer end of which arm carries one end of a rod 60 with the result that forward and back movement of the shifter fork will likewise cause forward and backward movement of the rod 60. A hole 61 is provided in the elongated boss 63 provided within the housing 23 and a pair of holes 64 and 65 are provided in the flange 66 of the casing 40 into which holes the rod 60 may extend in order to definitely secure the casing 40 in either of its two positions. It will be noted that the flange 66 extends into the boss 63 so that the strain upon the rod 60 in its locked position is taken directly upon the housing 23 with only a shearing action upon the rod 60.

In the operation of our improved device, it will be noted that forward and back movement of the shifting lever 50 will shift the pinion 32 into and out of mesh and will also move the rod 60 into and out of engagement with the holes in the flange 66, and the boss 63. Sidewise movement of the shifting lever 50 will cause rotation of the shaft 45 through the arm 48 to raise and lower the casing 40 and consequently the double gear 35 and the forward end of the propeller shaft 14, to permit engagement of the pinion 32 with either of the internal gears 37 or 38 to thereby provide a lesser or greater speed to be imparted to the propeller shaft. When this is done, the self-aligning bearing 39 and the special construction of the bearing casing in the radius 13 will compensate for the slight change in alignment of the propeller shaft 14.

In this connection, it will be noted that the nut 36 on the end of the propeller shaft 14 is small enough to pass within the end of the pinion 32 so that when the gears are in direct driving connection the nut 36 will be positioned within the pinion 32 and additional length in order to clear the nut is not necessary.

It will also be noted that the shafts 14 and 28 are parallel to each other when the pinion 32 is meshed with the gear 37 in the "in gear" position. Likewise when the pinion is engaging with the gear 38 for direct drive, the shafts 28 and 14 are slightly at an angle to each other. This arrangement results in a much quieter and much more efficient operating transmission in view of the fact that the slight angularity is taken up in the clutch-like arrangement of the gears in direct drive. This arrangement of the shafts is clearly shown in Fig. 2 of the drawing, it being understood that Fig. 1 being in the nature of a plan view, would not show any misalignment of the shafts.

It will further be noted that no universal joints are utilized in the propeller shaft, the bearings forming the sole compensating means for the tilting thereof and the pinion on the propellor shaft being tilted somewhat in the drive gear 95. Theoretically, this tilting of the pinion may not seem wise, but from a practical and commercial standpoint, very efficient results are obtained.

It will be obvious that various changes may be made in the arrangement, combination and construction of the various parts of our improved device without departing from the spirit of our invention, and it is our intention to cover by our claims such changes as may be reasonably included within the scope thereof. We desire it particularly to be understood that the gearing utilized in our transmission may be reversed,—that is to say, the internal gears placed on the drive shaft and the pinion on the propeller shaft, and wherein our claims refer to one arrangement of said gears, the other shall be considered as the equivalent.

What we claim is:

1. In combination, a rear axle housing having an opening therein, a member centered in said opening, a second member abutting said first member, a torque tube having a flange thereon abutting said second member, means securing said members and said flange to said axle housing, a propeller shaft in said tube and leading through said members into said housing, a gear on said shaft removed from said housing, a driving shaft having a gear thereon, means for moving the propeller shaft to mesh the gear thereon with the gear on the drive shaft, and a bearing in said first two members carrying said propeller shaft and adapted to tip with the shaft when it is moved.

2. In combination, a propeller shaft having a direct and indirect drive gear thereon, a drive shaft having a pinion thereon adapted to mesh with either of said gears, means for moving said propeller shaft to permit alternate engagement of the pinion with said gears, said shafts being parallel to each other in the indirect drive position and at an angle to each other in the direct drive position, and bearings carrying said propeller shaft adapted to compensate for the angularity thereof.

3. In combination, a rear axle housing, a propeller shaft extending into said housing, a torque tube around said shaft and connected at one end to said housing, a second torque tube connected at one end with the free end of said first torque tube having an enlarged housing on its free end, and means within said enlarged housing pivotally connected with the free end of said shaft to permit tilting of the same.

4. In combination, a rear axle housing, a propeller shaft extending into said housing, a torque tube around said shaft for a portion of the length of the shaft, means for connecting one end of said tube to said housing, a second torque tube adjacent the first and disposed around the remainder of said shaft, means for joining said tubes together consisting of disposing the end of one into the end of the other, a split ring spacing the inner periphery of one tube from the outer periphery of the other, a taper on a portion of said ring and a tapered wedge driven between the tapered portion of the ring and one of said tubes.

5. A construction as set forth in claim 4 wherein said wedge is provided with a flange and a flange is provided on the outside tube and bolts passing through said flanges for securing them together.

6. In combination, a drive shaft having a pinion slidably mounted thereon, a propeller shaft having a pair of different sized internal gears thereon, a shaft adjacent said gears and pinion, a sleeve on said shaft having a shifter fork thereon adapted to engage said pinion on the drive shaft, a shifting lever adapted to slide said sleeve and pinion, an arm pivoted to said shifting lever and fixed to said third shaft, whereby movement of the lever laterally of said third shaft will rotate the shaft, an arm extending from said shaft and connected with said propeller shaft, whereby rotation of said third shaft may raise or lower the said propeller shaft.

7. In combination, a driving shaft having a pinion slidable thereon, a propeller shaft having varying sized internal gears thereon, a casing around said propeller shaft, a housing for said shafts, gears and casing, means pivotally connecting said casing with the side of said housing, a third shaft mounted in said housing and having an arm thereon extending at an angle therefrom, means connecting said arm with said casing whereby when said third shaft is rotated, said arm will be moved to move said casing on its pivot point and accordingly tilt said propeller shaft, and means for sliding said pinion on said drive shaft to mesh with different ones of said gears when said propeller shaft is tilted to different positions.

8. In combination, a shaft having different sized gears thereon, a casing for said shaft, a housing for said casing, means pivotally connecting said casing and housing, a projection on said casing adjacent its pivot point, a slot in said projection, a pin extending through said slot, an arm secured to said pin and means for moving said arm to cause said pin to move in said slot and raise said casing and consequently said shaft.

9. In combination, a shaft having different sized gears thereon, a casing for said shaft, a housing for said casing, means pivotally connecting said casing and housing, means for moving said casing on its pivot and means for fixing said casing against further movement consisting of a projection on said casing having an opening therein, another opening in said projection and a pin adapted to extend through both said openings.

10. In combination, a shaft having different sized gears thereon, a casing for said shaft, a housing for said casing, means pivotally connecting said casing and housing, means for moving said casing on its pivot and means for fixing said casing against further movement consisting of an apertured boss on said housing, a projection on said casing extending across said boss and its aperture, an aperture in said projection adapted to be aligned with said boss aperture and a pin extending through said apertures.

11. In combination, a shaft having a slidable pinion thereon, another shaft having fixed varying sized gears thereon, a casing around said second shaft, a housing for said casing, means pivotally connecting said casing and housing, a third shaft having means thereon for moving said casing on its pivot, a shifter fork on said third shaft for sliding said pinion, an arm on said fork, a pin carried by said arm, an apertured boss in said housing, said aperture and pin being concentric, a projection on said casing intersecting said boss and its aperture, an aperture in said projection adapted to align with said aperture, whereby sliding movement of the shifter fork may force said pin through said apertures to lock said casing in place.

12. In combination, a rear axle housing, a propeller shaft extended therein, a drive shaft, gearing connecting said shafts, a pinion on said propeller shaft within said rear axle housing, and connecting with the rear axle gearing, means for tilting said propeller shaft for changing the driving speed thereof, and correspondingly tilting the said pinion in said rear axle housing, without breaking the connection between said pinion and said rear axle gearing.

13. In combination, a propeller shaft having a gear thereon, a drive shaft having a gear thereon, means for tilting said propeller shaft to permit the meshing of said gears, bearings carrying said propeller shaft and adapted to tilt with said shaft to compensate for the angularity of the movement thereof, said bearings constituting the sole compensating means for the tilting of said propeller shaft.

14. In combination, a rear axle having gearing therein, a propeller shaft having a pinion engaged with said rear axle gearing, indirect and direct drive gearing on said propeller shaft, a drive shaft having a pinion thereon adapted to alternately mesh with said gearing, means for tilting said propeller shaft and its pinion for permitting alternate meshing of said drive shaft pinion with said gearing while still maintaining said propeller shaft pinion in engagement with said rear axle gearing, said propeller shaft and drive shaft being parallel to each other in indirect drive and at an angle to each other in direct drive.

JOHN G. UTZ.
GUY MORGAN.